July 9, 1929.                J. C. MERWIN                1,720,285
                              DRAG CHAIN
                       Filed Jan. 31, 1927        2 Sheets-Sheet 1
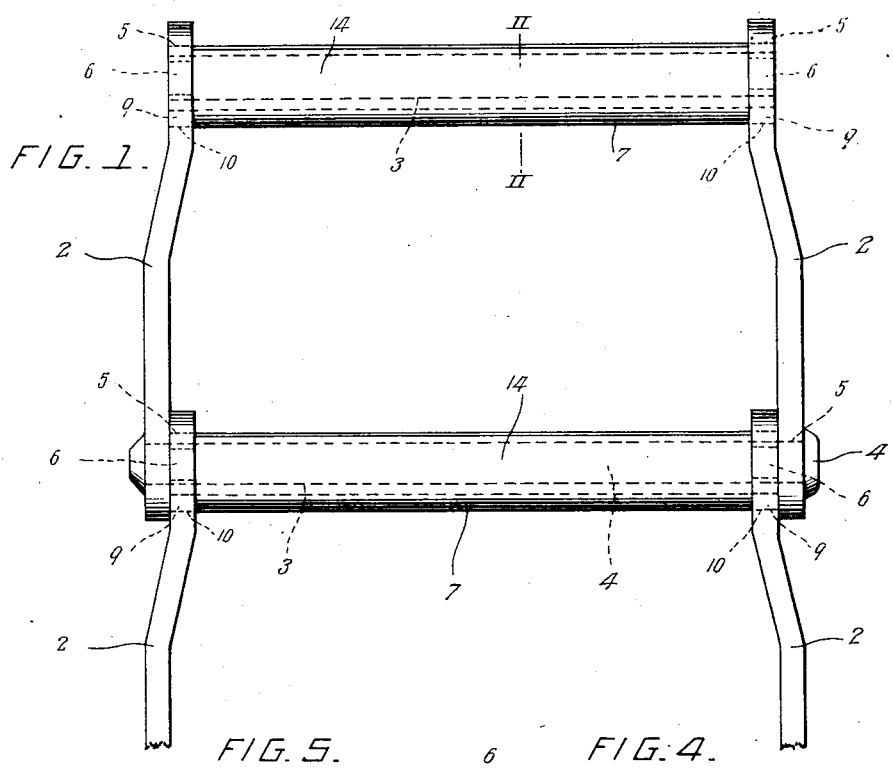
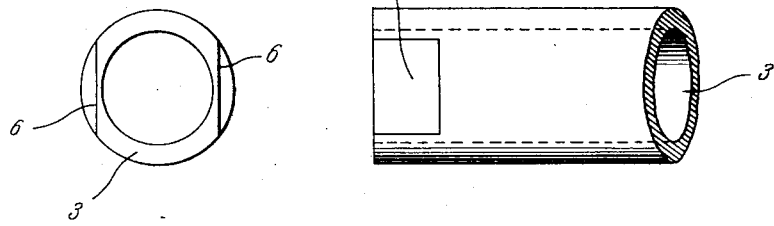
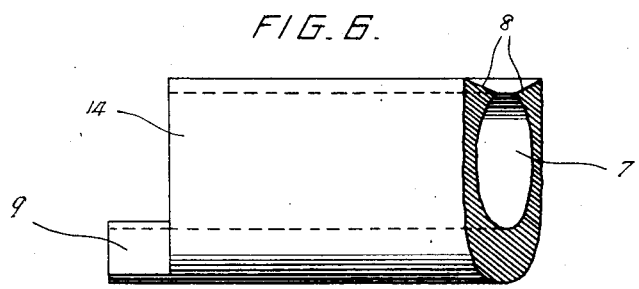

July 9, 1929.  J. C. MERWIN  1,720,285
DRAG CHAIN
Filed Jan. 31, 1927   2 Sheets-Sheet 2
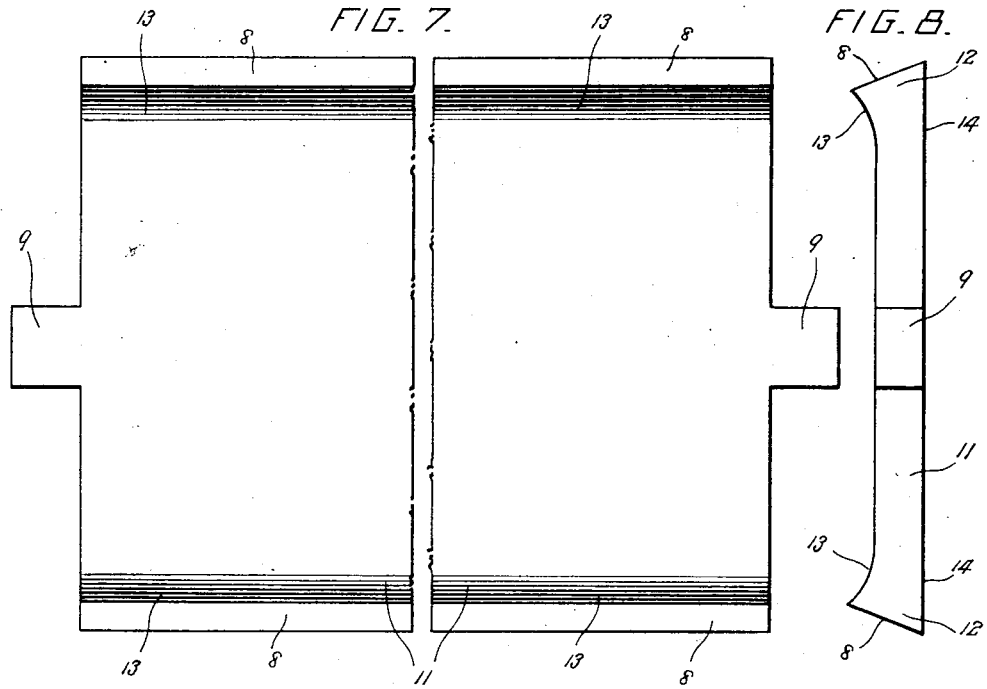
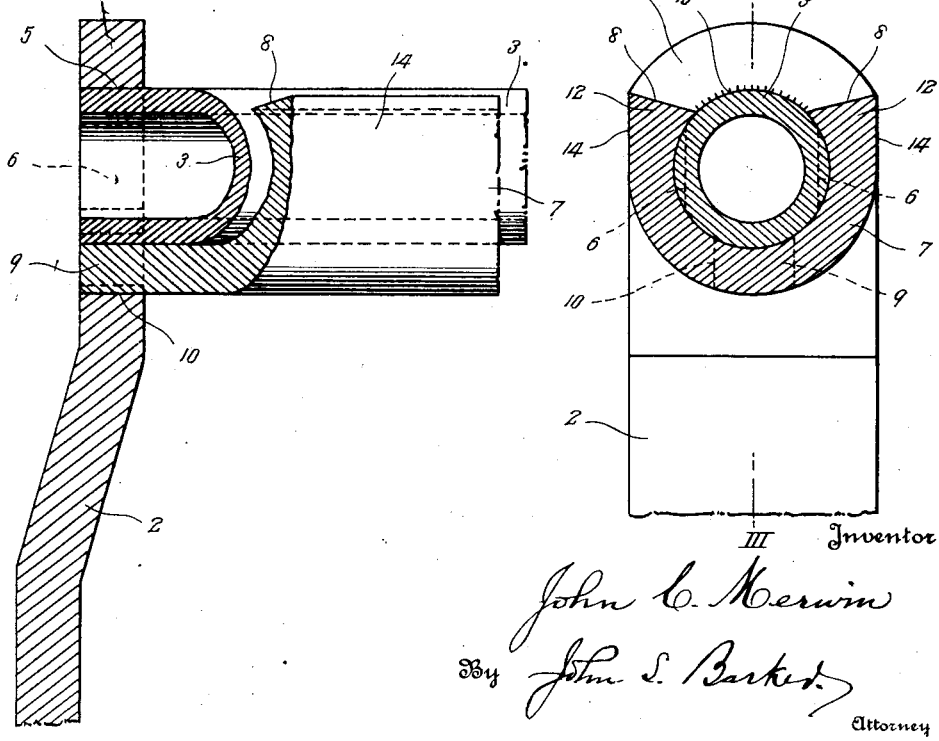

Patented July 9, 1929.

1,720,285

UNITED STATES PATENT OFFICE.

JOHN CLIFFORD MERWIN, OF MILWAUKEE, WISCONSIN, ASSIGNOR TO CHAIN BELT COMPANY, OF MILWAUKEE, WISCONSIN, A CORPORATION OF WISCONSIN.

DRAG CHAIN.

Application filed January 31, 1927. Serial No. 164,751.

My invention relates to drag chains, which are sprocket chains, usually of large size, that are constructed to convey loose and relatively fine material, such as sawdust, wood chips, ashes, and many other substances, by the direct engagement of the links themselves with the material they move. These chains usually travel in a trough with a flat bottom and low side edges, the material to be moved being delivered to the trough and the links of the chain advancing it along the same. The invention has for its object to improve drag chains, in the manner that will be described.

In the accompanying drawings Fig. 1 is a plan view of two links of a chain made according to my invention.

Fig. 2 is a longitudinal sectional view on the line II—II, Fig. 1.

Fig. 3 is a broken sectional view on the line III—III of Fig. 2.

Fig. 4 is an elevation of one end of a bushing that unites the side bars of the chain.

Fig. 5 is an end view of the bushing shown in Fig. 4.

Fig. 6 is a broken view of one end of the housing that partially surrounds the bushing.

Fig. 7 is a plan view of the blank, or piece of material from which the housing is shaped.

Fig. 8 is an edge view of the blank shown in Fig. 7.

Referring to the drawings, 2, 2, indicate the side bars of a sprocket chain link, 3 a bushing uniting such side bars at one end, and 4 a pintle that passes through the side bars and the hollow bushing and serves as the pivotal connection between two links. The parts described are well known in the art and, so far as the present invention is concerned, may be varied in construction within wide limits.

The bushing 3 is at its ends seated in openings 5 formed in the side bars and is united to the latter in such manner as to be non-rotatable in its seats. The ends of the bushing represented are milled, as at 6, to form flat faces, thus making the ends non-circular in cross section. These ends are tightly fitted into the openings 5 which are correspondingly shaped to receive them. The ends of the pintles are represented as being headed so as to prevent lateral separation of the side bars, and they are preferably united with the side bars in such manner as to be non-rotative in their seats in the latter. The arrangement described insures that the movements due to the articulations of adjacent links of the chain shall be between the pintles 4 and the inner walls of the bushings 3. The advantages of this arrangement are well known and are not herein claimed to be novel.

Partially surrounding, and closely seated upon, each bushing is a housing 7. The edges 8 of this housing extend outward from the bushing toward the opposite edges of the side bars, as represented in Fig. 2, and serve as pushing faces for the material that is moved by the chain. Each housing is provided at its opposite ends with projections 9, preferably integral, that are adapted to enter recesses 10 formed therefor in the side bars, the recesses 10 preferably communicating with the openings 5 for the bushings. These projections, which fit tightly in the recesses 10, serve to unite the housing with the side bars of the chain, and cause the bushing and the housing to move as a single part.

In Figs. 7 and 8 a blank 11 from which a housing 7 is formed is represented in the flat, that is before it has been curled upon and shaped to the bushing. This blank is formed of a piece of metal of suitable thickness, the opposite edge portions 12 of which may be thickened, as best shown in Fig. 8. The thickened portions of the blank are on one face curved, as indicated at 13, the curve being preferably of a radius that will conform to the outer surface of the bushing 3, when curled. The surface 14 of the blank opposite the curved surface 13 is flat.

In manufacturing a chain such as described, the blank 11 is curled by suitable machinery into C-shape with an inner diameter slightly less than the outer diameter of the bushing. After the blank is curled it is pressed onto the bushing 3 by suitable machinery. The width of the blank is such that when curled and pressed onto the bushing, practically a fourth of the surface of the latter is left exposed between the faces 8 as represented in Fig. 2.

The parts described, namely the bushing, housing and side bars, are then assembled into a chain link, by inserting the ends of a bushing into the openings 5 in a pair of side bars and inserting the projections 9 of the housing 7 into the recesses 10. These operations are performed by suitable machinery that forces the projecting parts tightly into their respective seats. After being seated the ends of the bushings 3 may, if found desirable, be expanded somewhat to insure against separation from the side bars. The joints between the side bars 2 and the ends of the bushing 3, and extending from the inner edge of one face 8 to the corresponding edge of the opposite face, may be welded, as represented at 15, to positively insure against separation of the parts and also against any of the material that may be acted upon by the conveyor, or any other substance from working into the openings 5 along such joints.

It will be seen by reference to Fig. 2 that the flat outer faces 14 of the thickened edge portions 12 of the blank when the latter is curved upon or shaped to the bushing are in the planes of the opposite longitudinal edges of the side bars of the link.

This insures that when the chain is in use traveling along the bottom of a trough in which it operates the lower flat side 14 of the housing rests directly upon the bottom of the trough, and the forward edge of the housing attachment, where the faces 8 and 14 meet, shall serve as a scraper acting in close engagement with the bottom of the trough.

The chain which I have described is of very sturdy construction, can be cheaply and easily manufactured, the parts are not liable to separation, and the housing constitutes a scraper with a good working or material-advancing face or faces, and that also has a flat bearing upon the trough. The rear surfaces of the housings, that is those on the sides of the bushings opposite the working faces 8, are curved so as to have good working engagement with the sprockets of the wheels that support and drive the chain. If a housing becomes worn, broken, or otherwise rendered inefficient, it may be separated from the chain link provided the parts of the chain have not been welded or otherwise permanently united and a new housing substituted without necessitating the discarding of the entire link.

What I claim is:

1. The combination with a link for an articulated drag chain having side bars and a cross bar uniting them, of a scraper attachment partially encircling the cross bar and having a material-engaging face extending outward therefrom.

2. The combination with a link of an articulated drag chain having side bars and a cross bar uniting them, of a scraper attachment partly encircling the cross bar, the opposite ends of the attachment constituting material-engaging faces extending outwardly from the cross bar on opposite sides of a central plane passing longitudinally through the axis of articulation of the link.

3. The combination with a link of an articulated, pintle-connected drag chain having side bars and a tubular cylindrical cross bar uniting them, of a C-shaped attachment partially encircling the cross bar, an end of the attachment extending outwardly from the cross bar and between the side bars being shaped to serve as a material-engaging scraper.

4. The combination such as recited in claim 3 having both ends of the C-shaped attachment shaped to serve as material-engaging scrapers these extending outwardly in opposite directions from the cross bar, which is exposed between them.

5. The combination with a link of an articulated drag chain having side bars and a cylindrical cross bar uniting them, of a scraper attachment curled about the cross bar so as to partially encircle it, an end portion of the attachment being thickened and having its edge flat to serve as a scraper for engaging with and advancing material.

6. The combination stated in claim 5 having both end portions of the attachment thickened and with their edges flat to serve as material-engaging and advancing scrapers, the length of the attachment being such as to but partially encircle the cross bar.

7. The combination stated in claim 5 in which the inner face of the thickened portion of the attachment is curved to fit the outer surface of the cross bar, and the opposite, outer, face of such portion is flat.

8. The combination with a link of an articulated drag chain having side bars and a cross bar for uniting them having its ends non-rotatably engaged therewith, of a scraper attachment partially encircling the cross bar, the attachment having its encircling portion formed at its ends for direct engagement with the side bars to prevent rotative movement thereof relative to the cross bar.

9. The combination with a link of a pintle-connected drag chain having side bars and a tubular cylindrical cross bar uniting them, the cross bar being separate from the side bars and having its ends non-rotatively engaging therewith, of a C-shaped scraper attachment partially encircling the cross bar and supported so as to be non-rotatable relative thereto, the opposite ends of the attachment being shaped to serve as material-engaging faces extending outwardly from the cross bar, and being separated so as to leave a portion of the cross bar between them exposed, the joints of the cross bar with the side bars of the link, between the said material-engaging faces, being welded.

10. A drag chain link having side bars formed with openings 5 and recesses 10, a tubular cross bar the ends of which are nonrotatively seated in the openings 5 in the side bars, thus uniting the latter, and a scraper attachment partially encircling the cross bar, the opposite ends of the attachment constituting material-engaging surfaces 8 between which is an exposed portion of the cross bar, the attachment being formed with projections that enter the recesses 10 in the side bars, thereby uniting the attachment to the latter and preventing any rotative movement thereof relative to the cross bar.

JOHN CLIFFORD MERWIN.